(12) United States Patent
Guida

(10) Patent No.: US 9,758,214 B2
(45) Date of Patent: Sep. 12, 2017

(54) PORTABLE MULTI-PLATFORM FRICTION DRIVE SYSTEM WITH RETRACTABLE MOTOR DRIVE ASSEMBLY

(71) Applicant: Jeffrey E Guida, New York, NY (US)

(72) Inventor: Jeffrey E Guida, New York, NY (US)

(73) Assignee: ShareRoller LLC., New York, NY (US)

( * ) Notice: Subject to any disclaimer, the term of this patent is extended or adjusted under 35 U.S.C. 154(b) by 0 days.

(21) Appl. No.: 14/616,698

(22) Filed: Feb. 7, 2015

(65) Prior Publication Data
US 2016/0257374 A1    Sep. 8, 2016

Related U.S. Application Data

(60) Provisional application No. 61/934,739, filed on Feb. 1, 2014, provisional application No. 61/934,746, filed on Feb. 1, 2014.

(51) Int. Cl.
| | |
|---|---|
| *B62M 6/75* | (2010.01) |
| *B62K 3/00* | (2006.01) |
| *F16H 13/04* | (2006.01) |
| *F16H 13/10* | (2006.01) |

(52) U.S. Cl.
CPC .............. *B62M 6/75* (2013.01); *B62K 3/002* (2013.01); *F16H 13/04* (2013.01); *F16H 13/10* (2013.01)

(58) Field of Classification Search
CPC ....................................................... B62M 6/75
USPC ............................. 180/221, 181, 65.1, 65.51
See application file for complete search history.

(56) References Cited

U.S. PATENT DOCUMENTS

| | | | | |
|---|---|---|---|---|
| 1,191,287 | A | * 7/1916 | Du Vaux ................. | B62M 6/35 180/205.7 |
| 2,578,886 | A | * 12/1951 | Isherwood .............. | B62M 7/10 180/221 |
| 3,431,994 | A | * 3/1969 | Wood, Jr. ................ | B62M 6/75 180/206.8 |

(Continued)

FOREIGN PATENT DOCUMENTS

| | | |
|---|---|---|
| EP | 0155185 A2 | 9/1985 |
| EP | 1398265 A1 | 3/2004 |
| KR | 101249809 | 2/2013 |

OTHER PUBLICATIONS

PCT, International Search Report for PCT/IB2015/052415, dated Sep. 17, 2015.

(Continued)

*Primary Examiner* — Jeffrey J Restifo
(74) *Attorney, Agent, or Firm* — Aaron Perez-Daple

(57) ABSTRACT

A portable, multi-platform friction drive system with a retractable motor drive assembly (12), containing all needed components of an electric friction drive system in a portable handheld case (10), including motor (18), batteries (34), and all associated electronics (36), as well as a mounting system (30) that enables use on popular bike share bicycles (20), personal bicycles, and kick scooters. Its mounting system (30) enables the friction drive system to be easily installed in seconds on many varieties of bicycles or kick scooters, and to be removed just as easily when no longer needed. And by means of its retractable motor assembly (12), the present invention enables the friction drive system to be as compact, clean, and safe as possible so as to be easily carried and stored when not in use.

22 Claims, 8 Drawing Sheets

(56) References Cited

U.S. PATENT DOCUMENTS

| | | | | |
|---|---|---|---|---|
| 3,841,428 A * | 10/1974 | Bialek | B62M 13/04 | 180/220 |
| 3,905,442 A * | 9/1975 | O'Neill, Jr. | B62M 13/00 | 180/206.8 |
| 3,966,007 A * | 6/1976 | Havener | B62M 6/90 | 180/206.8 |
| 4,081,048 A | 3/1978 | Hendricks | | |
| 4,113,043 A * | 9/1978 | Palmer | B62K 5/02 | 180/221 |
| 4,175,629 A * | 11/1979 | Kalajzich | B62M 6/75 | 180/220 |
| 4,386,675 A * | 6/1983 | Landon | B62K 5/02 | 180/221 |
| 4,579,188 A * | 4/1986 | Facer | B62M 13/04 | 180/211 |
| 4,637,274 A | 1/1987 | Goldenfeld | | |
| 5,078,227 A * | 1/1992 | Becker | A61G 5/045 | 180/220 |
| 5,423,393 A * | 6/1995 | Felt | B62M 13/04 | 180/221 |
| 5,470,281 A * | 11/1995 | Sinclair | B62M 6/75 | 474/139 |
| 5,491,390 A * | 2/1996 | McGreen | B62M 6/45 | 180/221 |
| 5,735,363 A * | 4/1998 | Horovitz | A61G 5/045 | 180/206.8 |
| 5,778,998 A * | 7/1998 | Shih | B62M 13/00 | 180/221 |
| 5,816,355 A | 10/1998 | Battlogg | | |
| 5,836,414 A | 11/1998 | Seto | | |
| 5,842,535 A * | 12/1998 | Dennis | B62M 13/00 | 180/206.8 |
| 6,065,557 A * | 5/2000 | von Keyserling | B62M 6/75 | 180/221 |
| 6,102,148 A * | 8/2000 | Chien | B62M 11/00 | 180/220 |
| 6,227,324 B1 * | 5/2001 | Sauve | B62D 61/02 | 180/181 |
| 6,318,491 B1 * | 11/2001 | Tung | B60T 1/04 | 180/180 |
| 6,497,299 B1 * | 12/2002 | Sinclair | B62M 13/04 | 180/206.8 |
| 6,899,192 B2 * | 5/2005 | Chen | B62K 3/002 | 180/206.8 |
| 7,441,621 B2 * | 10/2008 | Motte Dit Falisse | B62M 13/04 | 180/206.8 |
| 8,573,346 B2 * | 11/2013 | Duignan | B62M 6/35 | 180/205.7 |
| 8,602,148 B2 * | 12/2013 | Shwartz | B62M 6/70 | 180/205.1 |
| 2002/0027026 A1 * | 3/2002 | Hong | B62M 6/75 | 180/65.23 |
| 2002/0079855 A1 * | 6/2002 | Parks | B62K 3/002 | 318/560 |
| 2004/0251068 A1 * | 12/2004 | Chen | B62K 3/002 | 180/221 |
| 2008/0147281 A1 | 6/2008 | Ishii | | |
| 2011/0114407 A1 * | 5/2011 | Lee | B62M 6/75 | 180/206.8 |
| 2011/0168471 A1 * | 7/2011 | Duignan | B62M 6/75 | 180/205.7 |
| 2011/0232985 A1 * | 9/2011 | Lee | B62M 6/45 | 180/297 |
| 2013/0225360 A1 * | 8/2013 | Hirn | B62M 6/75 | 476/11 |
| 2016/0167734 A1 * | 6/2016 | Olsommer | B62M 6/75 | 310/83 |
| 2016/0167735 A1 * | 6/2016 | Olsommer | B62M 6/75 | 310/83 |

OTHER PUBLICATIONS http://web.archive.org/web/201501113005734/http://rubbee.co.uk/, web archive of rubbee.co.uk, dated Jan. 18, 2015.
http://rk.nvg.ntnu.no/sinclair/vehicles/zeta.htm, Chris Owen, 2003.
http://web.archive.org/web/20150118005734/http://rubbee.co.uk/, web archive of rubbee.co.uk, dated Jan. 18, 2015.

* cited by examiner

PORTABLE MULTI-PLATFORM FRICTION DRIVE SYSTEM WITH RETRACTABLE MOTOR DRIVE ASSEMBLY

CROSS-REFERENCE TO RELATED APPLICATIONS

This application claims the benefit of provisional patent application Ser. No. 61/934,739 and Ser. No. 61/934,746, both filed 1 Feb. 2014 by the present inventor.

FIELD OF THE INVENTION

The present invention is in the technical field of friction drive power systems.

BACKGROUND OF THE INVENTION

Friction drive power systems are commonly used in many applications, including to power bicycle wheels by means of a motor driving a bicycle tire directly or indirectly. The motor is typically mounted in a semi-permanent or permanent fixed position adjacent to either wheel. The motor can then either drive the wheel through a secondary roller mechanism pressed against the tire or directly via tire contact with the rotating outer shell of an outrunner-type motor.

Friction drive power systems designed for bicycle use have thus comprised a roller mechanism driving the front wheel, like Patent No. U.S. Pat. No. 3,431,944 to Wood or Patent No. EP 0155185 to Barker. Or alternatively, a roller mechanism positioned to drive the rear wheel like Patent No. EP 1398265 to Motte. Or alternatively, a direct outrunner-motor drive on the rear tire like U.S. Patent App. No. 2011/0232985 to Lee or U.S. Patent App. No. 2013/0225360 to Hirn.

However, substantially all implementations of friction drive power systems for bicycles are permanently or semi-permanently installed on a single bicycle, and are not easily removed and reinstalled on the same or other bicycle. In addition, substantially all bicycle friction drive systems are unable to power common bicycle share bikes. Moreover, substantially all bicycle friction drive systems are unable to power other non-bicycle wheeled vehicles like kick scooters. And further, substantially all existing friction drive systems are not fully contained in a lightweight, compact, and conveniently carried package, and possess no means to safely and cleanly contain the motor or roller system, which can be dangerous if activated accidentally and is frequently dirty from use.

SUMMARY OF THE INVENTION

The present invention relates to a portable, multi-platform, friction drive system with a retractable motor drive assembly for use on bicycles, kick scooters, or other wheeled personal transport vehicles. Embodiments of the present invention contain all needed components of an electric friction drive system in a portable handheld case, including motor, batteries, and all associated electronics, as well as a mounting system that both enables use on popular bike share bicycles and enables use on multiple different bicycle and scooter types, as well as other wheeled vehicles. By means of its mounting system, embodiments of the present invention enable the friction drive system to be easily and quickly installed and used on multiple varieties of bicycles, kick scooters, or other wheeled vehicles, and to be removed easily when no longer needed. And by means of its retractable motor assembly, which both minimizes the carrying size and protects the user from the motor or roller, embodiments of the present invention enable the friction drive system to be easily carried and stored when not in use, with the potentially dangerous and dirty motor roller enclosed safely inside the case.

REFERENCE NUMERALS IN THE DRAWINGS

Figure 1:
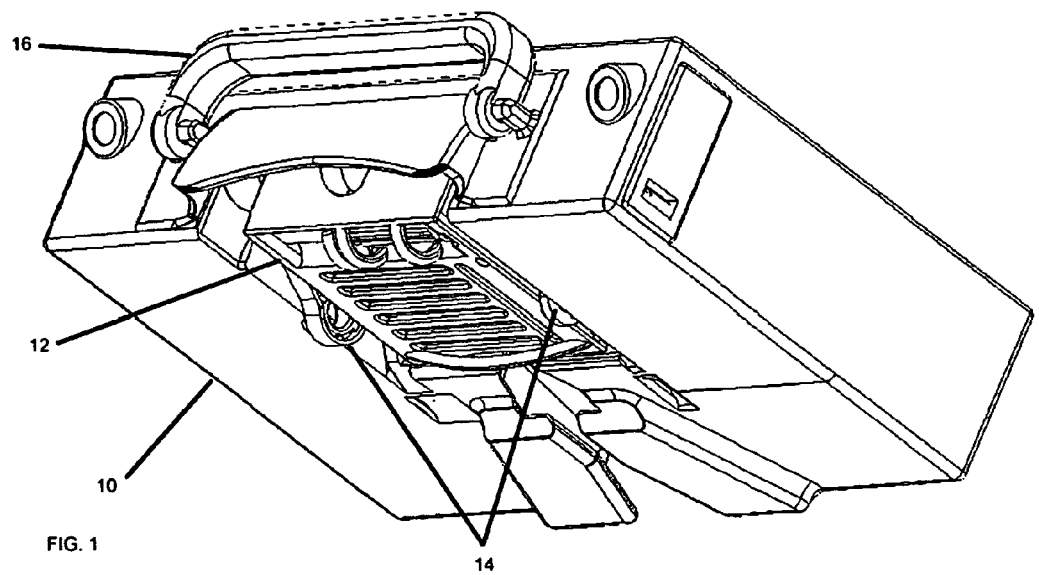
FIG. 1 shows a front perspective view of an embodiment of the present invention by itself with the retractable motor assembly in a retracted state, with the motor drive assembly secured inside the carrying case for transport or storage.

10 Portable friction drive system carrying case
12 Retractable motor drive assembly
14 Motor drive assembly pivot arms
16 Carrying handle for portable friction drive system
18 Drive motor or wheel for friction drive system
20 Public bike share bicycle
22 Public bike share docking mount
24 Front tires of public bike share bicycle
26 Front fork of public bike share bicycle
28 Plunger hole in docking mount
30 Mount receptacle
32 Sliding plunger mechanism for securing device to mounting hole in docking mount
34 Battery packs
36 Electronic control unit
38 Custom mount for kick scooter
40 Kick scooter front wheel
42 Kick scooter front fork
44 Custom mount for folding bicycle
46 Folding bicycle front tire
48 Folding bicycle front fork

DETAILED DESCRIPTION OF THE INVENTION

Referring now to the invention in more detail, in FIG. 1 through FIG. 15, there is shown various embodiments of the present invention as a portable, multi-platform friction drive system with retractable motor drive assembly, along with various examples of it installed in the operating position of various bicycles and scooters.

FIG. 1 shows a perspective view of an embodiment of the present invention with the retractable motor drive assembly in a retracted state, with the motor drive assembly secured inside the carrying case for transport or storage.

The overall carrying case for an embodiment of the portable friction drive system 10 is pictured with the retractable motor drive assembly 12 in its stored position, attached to the carrying case via motor drive assembly pivot arms 14. Optionally, the carrying case can include a carrying handle 16 for easy portability.

Figure 2:
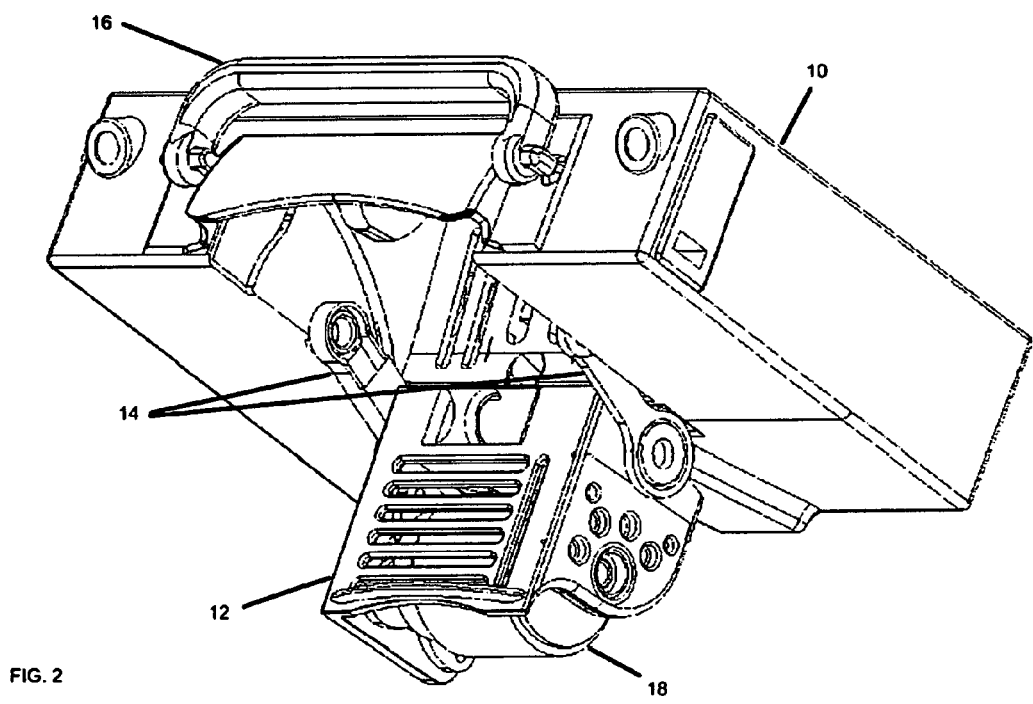
FIG. 2 shows a front perspective view of an embodiment of the present invention by itself with the retractable motor assembly in an expanded state, with the motor drive assembly rotated out from the carrying case and in position to drive the tire or wheel.

FIG. 2 shows a perspective view of an embodiment of the present invention with the retractable motor drive assembly in an expanded state, with the motor drive assembly rotated out from the carrying case and in position to drive the bicycle tire or scooter wheel.

The overall carrying case 10 is pictured with the retractable motor drive assembly 12 in its expanded position, swung out from the carrying case via rotation of the motor drive assembly pivot arms 14. The motor drive assembly is now in position to place the drive motor or wheel 18 directly against the bicycle tire or scooter wheel to enable a friction drive mechanism. Optionally, the carrying case can include a carrying handle 16 for easy portability.

Figure 3:
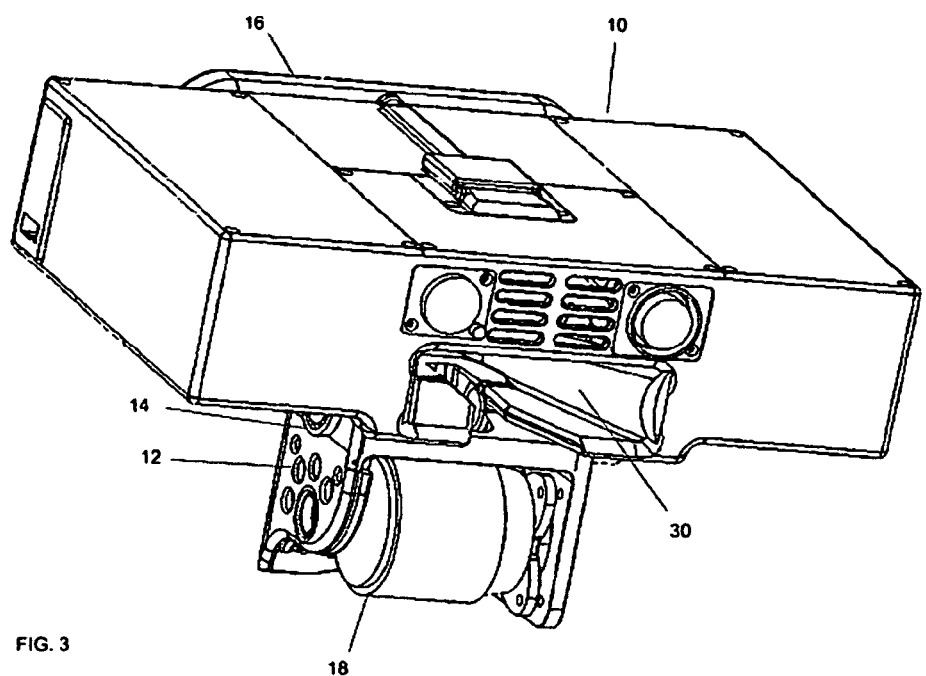
FIG. 3 is a back perspective view of an embodiment of the present invention by itself with the retractable motor assembly in an expanded state, with the motor drive assembly rotated out from the carrying case and in position to drive the tire or wheel.

FIG. 3 shows a rear view of an embodiment of the present invention with the retractable motor drive assembly in an expanded state, with the motor drive assembly rotated out from the carrying case and in position to drive the bicycle tire or scooter wheel.

The overall carrying case 10 is pictured with the retractable motor drive assembly 12 in its expanded position, swung out from the carrying case via rotation of the motor drive assembly pivot arms 14. The motor drive assembly is now in position to place the drive motor or wheel 18 directly against the bicycle tire, scooter wheel, or other vehicle wheel when the carrying case 10 is installed onto a suitable mount by means of inserting the mount into the mount receptacle 30 and connecting the motor drive assembly 12 to the mount, thereby pressing the drive motor or wheel 18 against the bicycle tire, scooter wheel, or other vehicle wheel.

Figure 4:
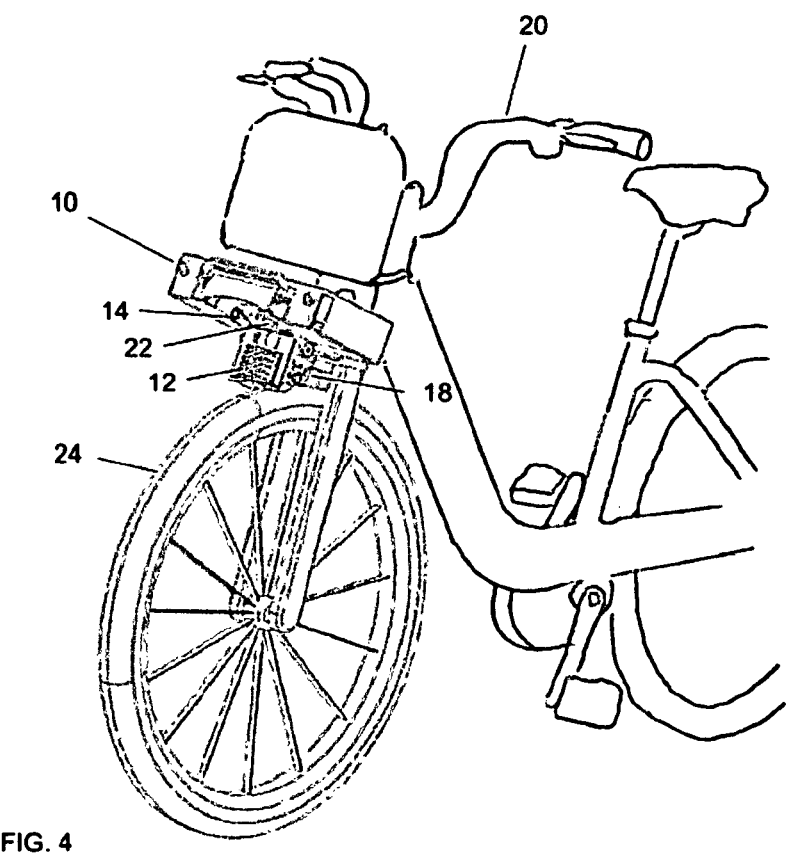
FIG. 4 is a perspective view of an embodiment of the present invention with the retractable motor assembly in an expanded state and mounted on a public bike share bicycle, with the motor drive assembly rotated out from the carrying case, locked onto the mounting bracket of the bicycle, and in position to drive the tire or wheel.

FIG. 4 shows a front perspective view of a common bike share bicycle 20 with an embodiment of the present invention attached and ready for operation.

The overall carrying case 10 is pictured with the retractable motor drive assembly 12 in its expanded position, swung out from the carrying case via rotation of the motor drive assembly pivot arms 14. The carrying case 10 and the motor drive assembly 12 are both mounted on to the bike share docking mount 22 by means of inserting the mount 22 into the mount receptacle 30 and connecting the motor drive assembly 12 to the mount 22, so that the motor drive assembly 12 is now in position to press the drive motor or wheel 18 directly against the bicycle tire 24. The drive motor or drive wheel 18 is now able to power the bicycle wheel when it is activated by the battery and controller contained in this embodiment, which are controlled by an external throttle (not shown) operated by the rider. Another embodiment could have the motor activation controlled by a Pedal Assist Sensor.

Figure 5:
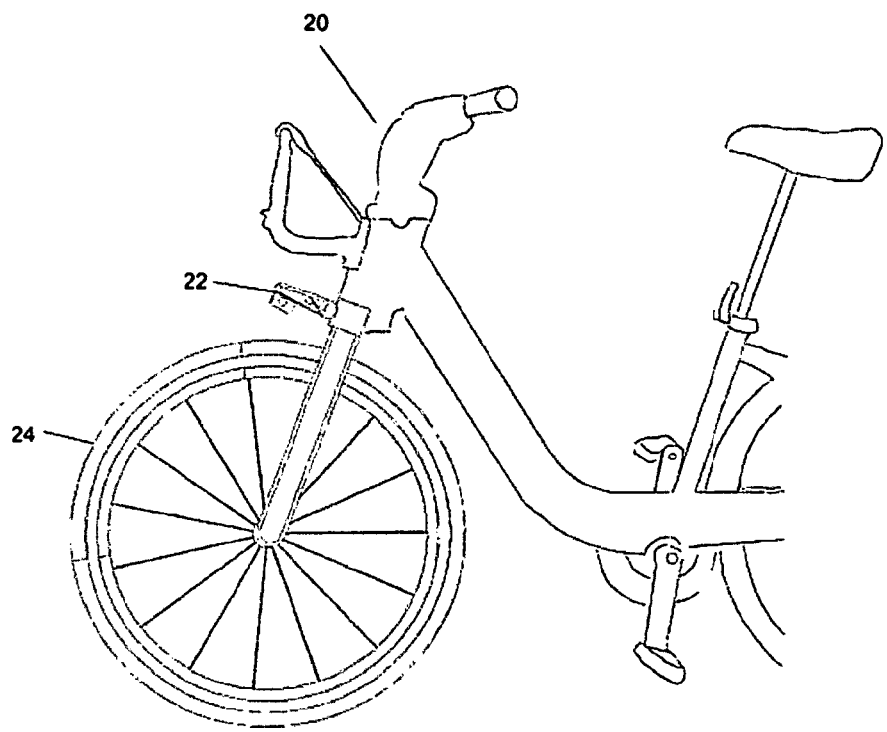
FIG. 5 is a side view of a public bike share bicycle showing the mounting bracket that an embodiment of the present invention is designed to attach to without any modifications.

FIG. 5 shows a side perspective view of a common bike share bicycle 20 without a friction drive system attached. The public bike share docking mount 22, used to dock the share bike in a bike share docking station, is clearly visible.

Figure 6:
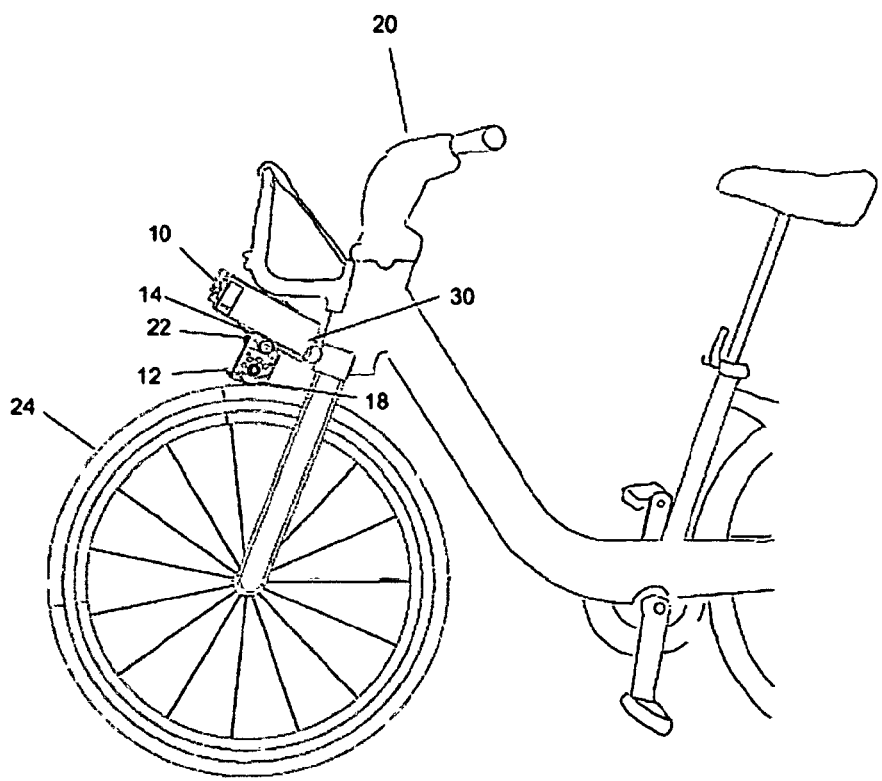
FIG. 6 is a side view of a public bike share bicycle showing an embodiment of the present invention attached to the mounting bracket with the motor drive assembly rotated out from the carrying case, locked onto the mounting bracket of the bicycle, and in position to drive the tire or wheel.

FIG. 6 shows a side perspective view of a common bike share bicycle 20 with an embodiment of the present invention mounted and attached to the public bike share docking mount 22, by means of inserting the mount 22 into the mount receptacle 30 and connecting the motor drive assembly 12 to the mount 22. The retractable motor drive assembly 12 is in its expanded position, rotated out from the carrying case via rotation of the motor drive assembly pivot arms 14, and the motor drive assembly 12 is now in position to press the drive motor or wheel 18 directly against the bicycle tire 24. The drive motor or drive wheel 18 is now able to power the bicycle wheel when it is activated by the battery and controller contained in this embodiment, which is controlled by the external throttle (not shown) operated by the rider. Another embodiment could have the motor activation controlled by a Pedal Assist Sensor.

Figure 7:
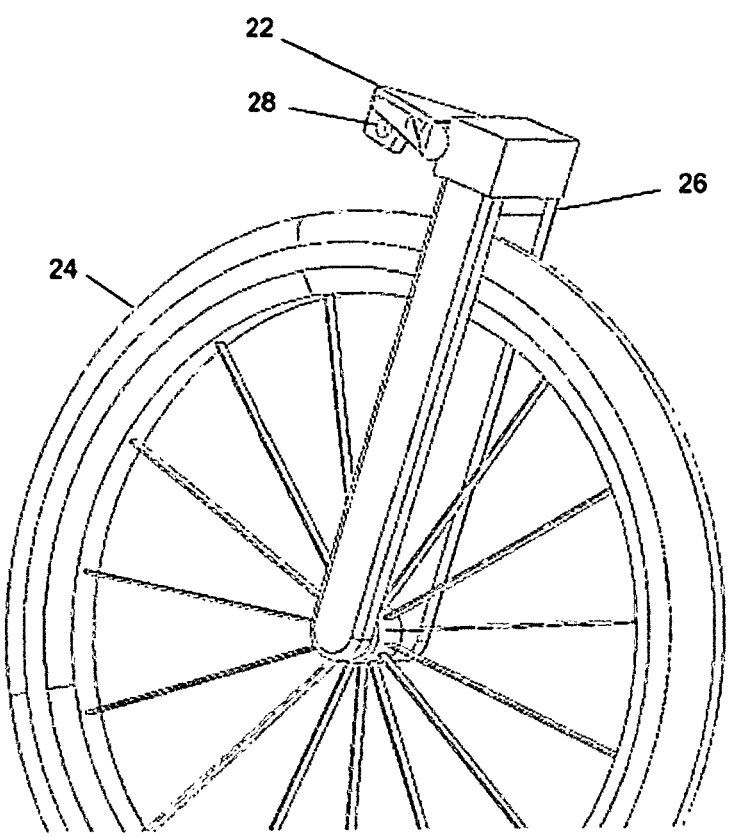
FIG. 7 is a rear perspective view of the mount and front wheel of a public bike share bicycle showing the mounting bracket that an embodiment of the present invention is designed to attach to without any modifications.

FIG. 7 shows a rear perspective view of the front wheel area of the public bike share bicycle 20 without a friction drive system attached, highlighting the triangular docking mount 22 used by this bicycle to secure it in a bike share docking station, and also used as a mounting point for embodiments of the present invention.

Figure 8:
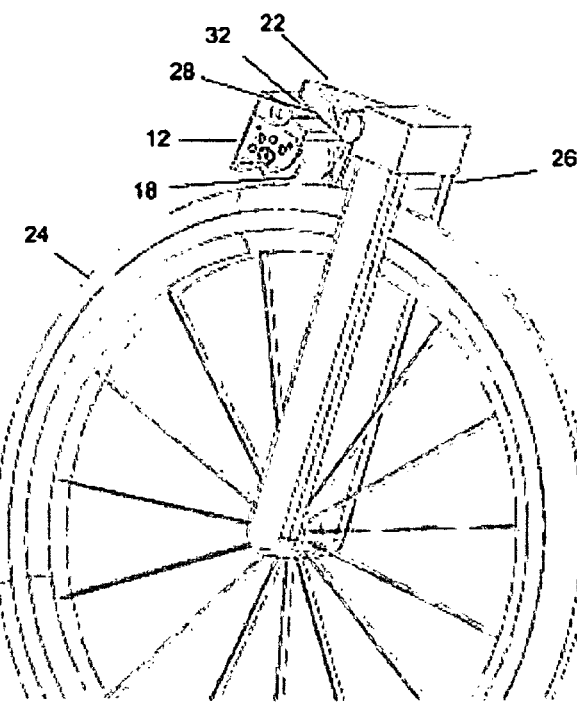
FIG. 8 is a rear perspective view of the mount and front wheel of a public bike share bicycle showing the mounting bracket that an embodiment of the present invention is designed to attach to without any modifications and the motor drive assembly of the present invention attached and locked to the mount, placing the motor in position to drive the wheel. For clarity, the carrying case containing batteries and electronics is omitted from this drawing.

FIG. 8 shows a rear perspective view of the front wheel area of a common bike share bicycle 20 with the motor drive assembly 12 attached by itself for clarity. The carrying case 10 and pivot arms 14 are excluded for illustration purposes. The motor drive assembly 12 is fastened to the public bike share docking mount 22 by means of the sliding plunger mechanism 32 contained inside the motor drive assembly 12 being inserted into the docking mount plunger hole 28

Figure 9:
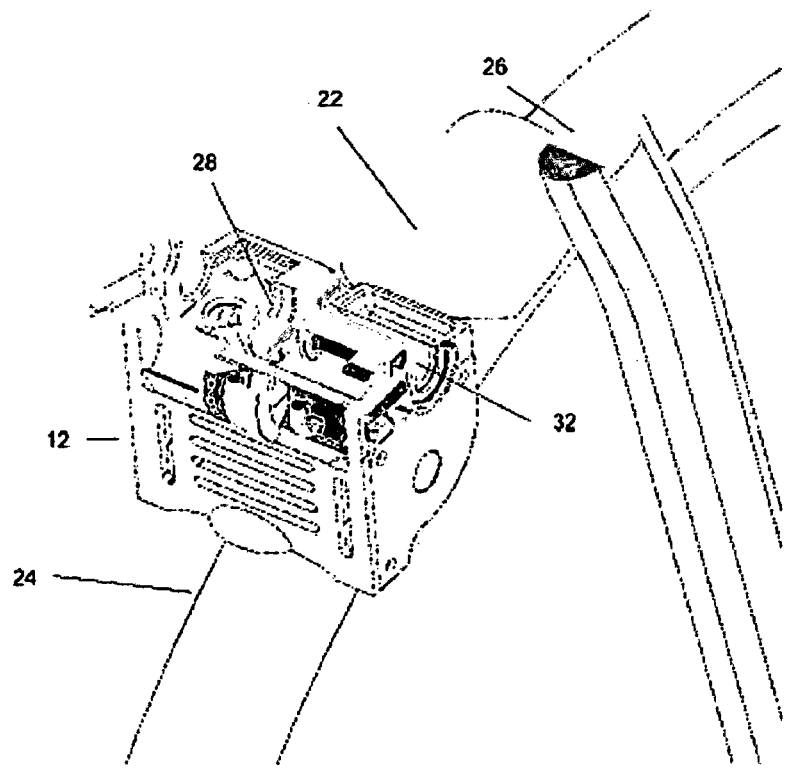
FIG. 9 is a cut-away view of the motor drive assembly installed on the mount of the public bike share bicycle, highlighting the sliding piston mechanism used to secure the motor drive assembly on the bike share bicycle mount.

FIG. 9 shows a close-up perspective view of the front wheel area of a common bike share bicycle, demonstrating a cut-away view of the motor drive assembly 12 attached by itself to the mount 22 for clarity. The carrying case 10 and pivot arms 14 are excluded for illustration purposes. The motor drive assembly 12 is fastened to the public bike share docking mount 22 by means of the sliding plunger mechanism 32 contained inside the motor drive assembly 12 being inserted into the docking mount plunger hole 28.

Figure 10:
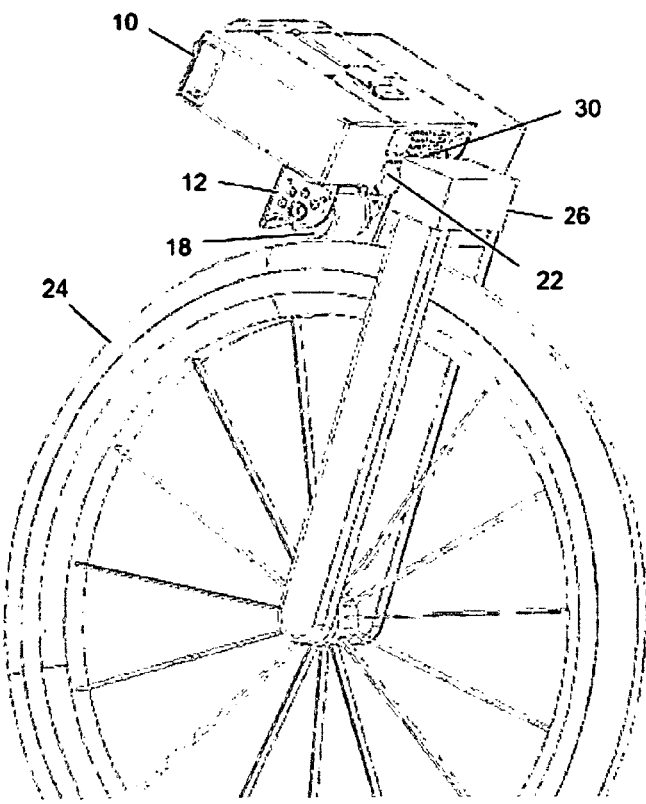
FIG. 10 is a rear perspective view of the mount and front wheel of a public bike share bicycle showing an embodiment of the present invention carrying case and motor drive assembly attached and secured to the mount, placing the motor in position to drive the wheel. The carrying case containing batteries and electronics is shown as attached.

FIG. 10 shows a rear perspective view of the front wheel area of the public bike share bicycle 20, now with the carrying case 10 and pivot arms 14 shown as in use. The carrying case 10 is positioned onto the triangular docking mount 22 by insertion of the docking mount 22 into the mount receptacle 30, a triangular recess designed to fit exactly over the triangular docking mount 22. The retractable motor drive assembly 12 is in its expanded position, swung out from the carrying case via rotation of the motor drive assembly pivot arms 14 and attached to the docking mount 22 via the plunger hole in docking mount 28 by means of insertion of the sliding plunger mechanism 32. Thus the carrying case 10 is also held firmly in place by the pivot arms 14, which are held in place firmly by the retractable motor assembly 12. The drive motor or wheel 18 is now in position to drive the front wheel 24 via friction drive.

Figure 11:
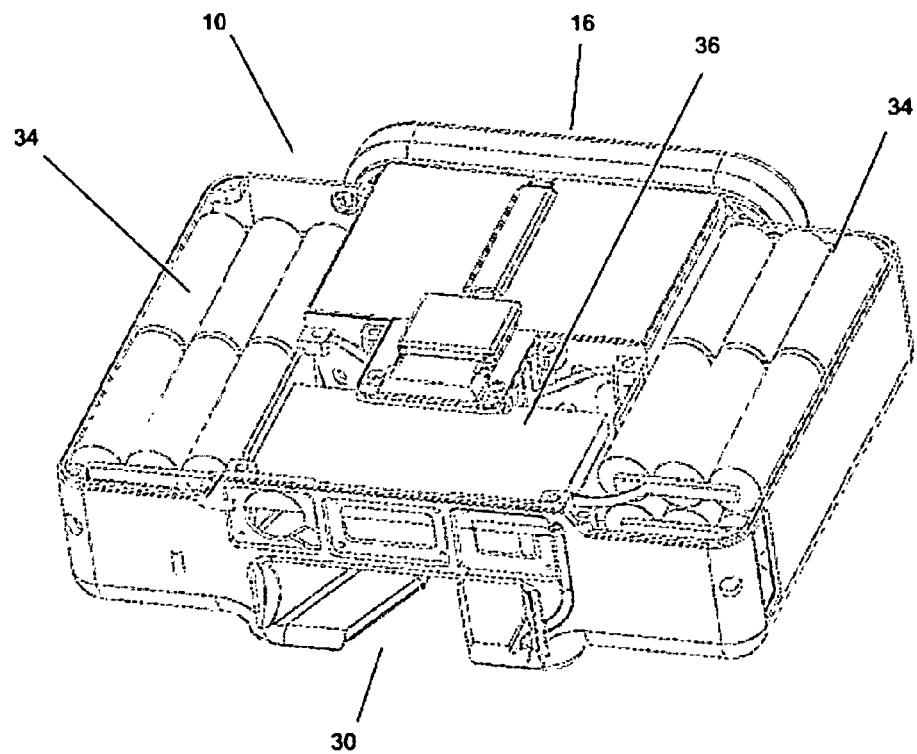
FIG. 11 is rear perspective view of an embodiment of the present invention with the top panel removed, showing the internal batteries and electronics that are contained within the device.

FIG. 11 shows a cut-away view of the inside of the carrying case 10, exhibiting the battery packs 34 and electronic control unit 36 contained inside.

Figure 12:
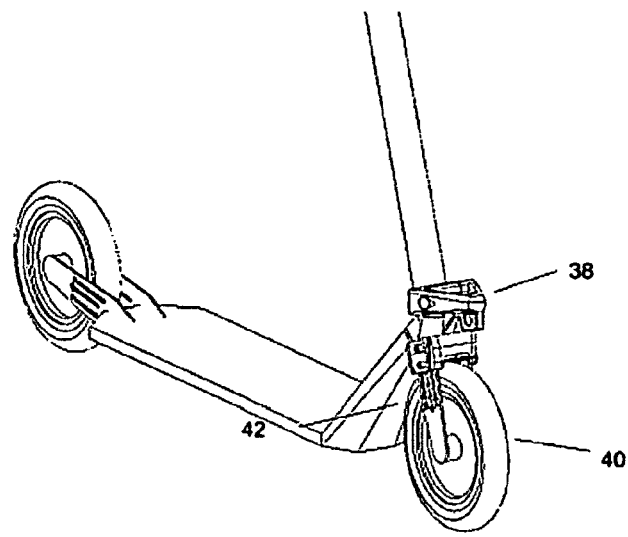
FIG. 12 is a front perspective view of a kick scooter with a custom mount with an embodiment of the present invention attached to it.

FIG. 12 shows the front wheel 40 and front fork 42 of a kick scooter along with the custom mount 38 for said kick scooter that replicates closely the bike share docking mount 22 and thus enables embodiments of the present invention to attach to the kick scooter and power it via friction drive in the same manner as it attaches to the bike share bicycle.

Figure 13:
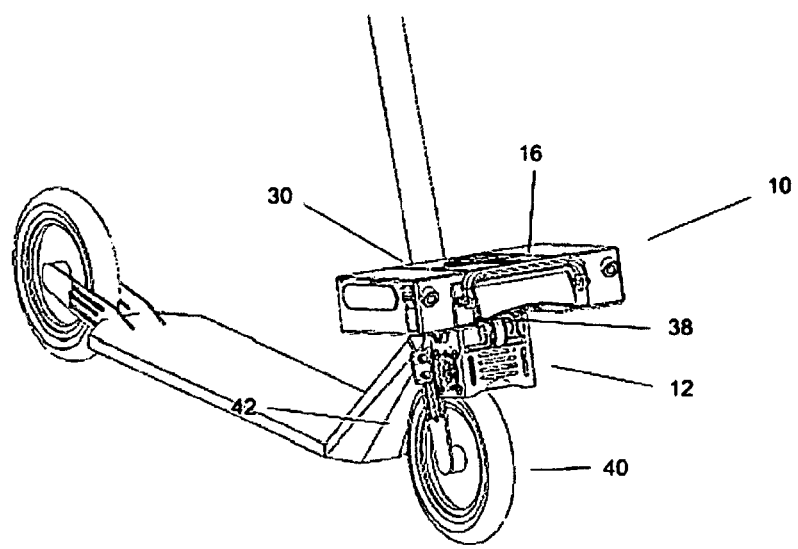
FIG. 13 is a front perspective view of an embodiment of the present invention installed on a kick scooter by means of the custom mount, with the motor drive assembly rotated out from the carrying case, locked onto the mounting bracket of the scooter, and in position to drive the front tire.

FIG. 13 shows an embodiment of the present invention mounted to the kick scooter of FIG. 12 by means of inserting the custom mount 38 into the mount receptacle 30, rotating out the motor drive assembly 12 and fastening it to the custom mount 38 by means of inserting the sliding plunger 32 Into the plunger hole of the custom mount 38, thereby securing both the carrying case 10 and the motor drive assembly 12 in position to press the drive motor or wheel 18 into the kick scooter front tire 40 and power the kick scooter via friction drive when the motor is activated.

Figure 14:
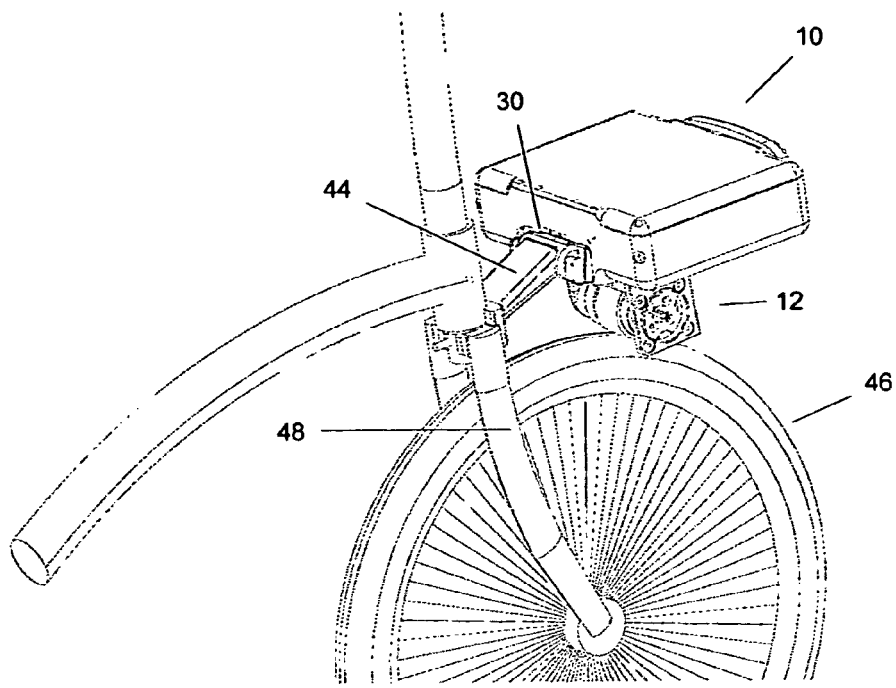
FIG. 14 is a rear perspective view of an embodiment of the present invention installed on a folding bicycle by means of a custom mount installed on the bicycle, with the motor drive assembly rotated out from the carrying case, locked onto the mounting bracket of the scooter, and in position to drive the front tire.

FIG. 14 shows an embodiment of the present invention mounted to a custom mount for a folding bike 44 that replicates closely the bike share docking mount 22 by means of inserting the custom mount 44 into the mount receptacle 30 in the carrying case 10, rotating out the motor drive assembly 12 and fastening it to the custom mount 44 by means of inserting the sliding plunger 32 into the plunger hole of the custom mount 44, thereby securing both the carrying case 10 and the motor drive assembly 12 in position to press the drive motor or wheel 18 into the folding bike front tire 46 and power the folding bike via friction drive when the motor is activated.

Figure 15:
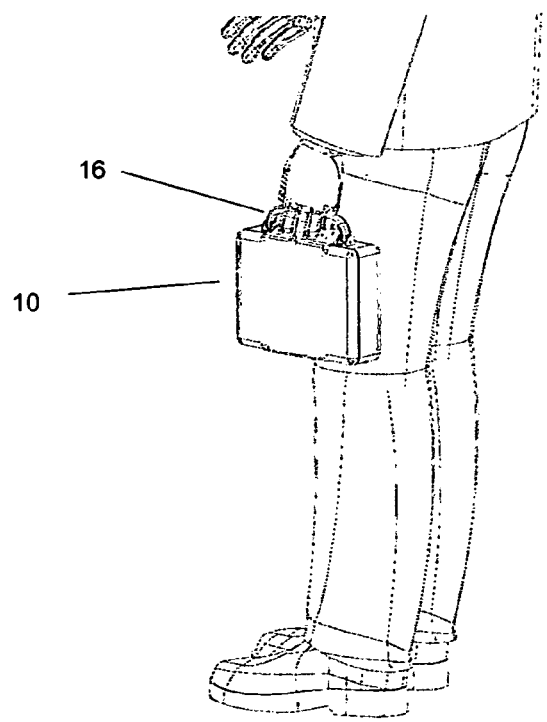
FIG. 15 is a perspective view of an embodiment of the present invention carried by a person in its uninstalled state, with the motor drive assembly retracted into the carrying case.

FIG. 15 shows an embodiment of the present invention carried by a person by means of the handle 16 while the retractable motor drive assembly 12 is contained inside the carrying case 10, thereby rendering the unit as compact as possible, protecting the person from dirt and debris on the motor, and further protecting the person from any possible danger caused by accidental activation of the drive motor or wheel.

In further detail, still referring to the embodiment of FIG. 1 through FIG. 15, the motor drive assembly pivot arms 14 are both attached to the portable friction drive system carrying case 10 via a pivoting hinge. Additionally, the retractable motor assembly 12 is attached to both motor drive assembly pivot arms 14 via a rotating hinge mechanism so that the retractable motor assembly 12 can rotate freely as the motor drive assembly pivot arms 14 swing inside the carrying case 10 for retraction while the friction drive system is not in use or swing outside the carrying case 10 for extension while the friction drive system is in use.

This enables the retractable motor assembly 12 to rotate such that the drive motor or wheel 18 is protected inside the case when the portable friction drive system is not in use and being transported. And this enables the retractable motor assembly 12 to rotate such that the drive motor or wheel 18 is exposed and in a position to drive the tire or wheel when the portable friction drive system is in use and mounted to a bicycle, scooter, or other wheeled vehicle.

While this embodiment is shown installing on a mount adjacent to the front wheel for front-wheel friction drive, other embodiments of the present invention could similarly install on a mount adjacent to the rear wheel and drive the rear wheel via friction drive in a similar manner.

Also, while this embodiment is shown installing on and interfacing with a triangular shaped mounting bracket common to a specific type of public bike share bicycles (model PBSC/Alta/Bixi shown as example), other embodiments could utilize multiple different types and shapes of brackets, including but not limited to rectangular brackets, cylindrical brackets, T-shaped brackets, L-shaped brackets, or others, as well as different sizes and configurations of mounting and docking points.

Further, while this embodiment is designed and tailored for bicycles and kick scooters, other embodiments of the present invention might have it configured and installed on other wheeled personal transport vehicles, including but not limited to freight bicycles, tandem bicycles, recumbent bicycles, trikes and tricycles, quadracycles, handcycles, rowing cycles, cabin cycles, velomobiles, cycle rickshaws, paddle boats, water cycles, hydrofoils, skateboards, wheelchairs, strollers, and other human powered vehicles or personal transport vehicles.

The construction details of the embodiments of the invention as shown in FIG. 1 through FIG. 15 are that the carrying case 10, retractable motor assembly 12, motor drive assembly pivot arms 14, carrying handle 16, and sliding plunger mechanism 32, as well as the custom mounts 38 and 44 and any other custom mounts designed for other bicycles, kick scooters, or other wheeled vehicles may be made of plastic, metal, or any other sufficiently rigid and strong material such as high-strength plastic, metal, and the like. The drive motor or wheel 18 can be engineered as an outrunner-type direct motor friction drive or as a secondary friction drive wheel powered by a separate motor. Further, the various components can be made of different materials.

Additionally, desired speed and power inputs from the rider can come from a wired or wireless throttle held by the rider or attached to the bicycle or scooter, or from a Pedal Assist Sensor installed on the bicycle pedals or cranks and connected to the present invention by a wired or wireless connection.

The advantages of embodiments of the present invention include, without limitation, reduced size when the friction drive system is not in use and the motor assembly has been retracted into the carrying case. Additionally, because of the pivoting and retracting motor assembly mechanism, the motor drive assembly is not exposed when it is retracted into the carrying case, thus protecting the user from dirt and grime that accumulates on the drive wheel or motor. Further, the pivoting and retracting motor assembly mechanism which results in the motor drive assembly being enclosed when it is retracted into the carrying case protects the user from injury should there be an accidental activation of the drive motor or wheel while the portable friction drive system is being transported.

The advantages of embodiments of the present invention for bike share bicycle use include, without limitation, the ability to use electric power to ride a bike share bicycle without requiring the expense or complexity of conventional electric bicycles, which typically require battery swap functionality and multi-battery docking stations for bike share use. Additionally, embodiments of the present invention allows individuals to add electric power to a bike share bicycle when it would otherwise not be available. This allows individuals to experience the benefits of electric bicycles including reduced effort, faster speed, and longer range, while taking advantage of the benefits of a bike share program. Embodiments of the present invention also allows bike share operators to benefit from increased membership due to the attractiveness of electric power to individuals, and higher asset utilization of their bike share fleet, as the higher speeds enabled by electric power shorten the time needed for an individual to complete a trip and allow the bike to be returned to the dock and checked out by another user more quickly.

The advantages of embodiments of the present invention to non-bike share bicycle use include, without limitation, the ability to add or remove electric friction drive power to a standard non-electric bike in seconds, the ability to use electric friction drive on multiple bikes interchangeably, the ability to use electric friction drive on multiple kick scooters interchangeably, and the ability to carry spare electric friction drive power in a briefcase or bag to be used whenever it is needed.

While the foregoing written description of various embodiments of the Invention enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope and spirit of the invention.

I claim:

1. A friction drive system comprising:
   a retractable motor drive assembly comprising:
      a pivot mechanism, and
      a drive motor;
   a battery capable of providing power to the drive motor;
   an electronic control unit capable of controlling delivery of power from the battery to the drive motor; and
   a case comprising a recess for the retractable motor drive assembly;
   a mounting mechanism capable of coupling with a mount, wherein the pivot mechanism is adjustable between a retracted position and an expanded position, and the retractable motor drive assembly is at least partially enclosed by the recess when the pivot mechanism is in the retracted position, and
   wherein the mounting mechanism further comprises a sliding plunger mechanism capable of securing the mounting mechanism to the mount.

2. The friction drive system of claim 1, wherein the electronic control unit controls the delivery of power from the battery to the drive motor in response to an input signal provided by a throttle mechanism.

3. The friction drive system of claim 1, wherein the electronic control unit controls the delivery of power from the battery to the drive motor in response to an input signal provided by a Pedal Assist Sensor.

4. The friction drive system of claim 1, wherein the case at least partially encloses the battery and the electronic control unit and the case comprises a handle for carrying the friction drive system as a portable unit.

5. The friction drive system of claim 1, wherein the mount is disposed on a bike share bicycle and the mount is capable of coupling the bicycle to a bike share docking station.

6. The friction drive system of claim 1, wherein the mount is disposed on a wheeled vehicle, and the drive motor is capable of engaging with a front tire or a rear tire of the wheeled vehicle when the pivot mechanism is in the expanded position and when the mounting mechanism is securely coupled to the mount.

7. The friction drive system of claim 6, wherein the wheeled vehicle is one of a bicycle or a scooter.

8. The friction drive system of claim 1, wherein the retractable motor drive assembly further comprises a roller, the drive motor is capable of delivering power to the roller, and the roller is capable of engaging with a tire or a wheel of a wheeled vehicle when the pivot mechanism is in the expanded position.

9. The friction drive system of claim 1, wherein the mounting mechanism comprises a triangular receptacle capable of receiving a triangular shaped mounting bracket on the mount.

10. A friction drive system comprising:
    a motor drive assembly comprising a drive motor;
    a battery capable of providing power to the drive motor;
    an electronic control unit capable of controlling delivery of power from the battery to the drive motor;
    a mounting mechanism comprising a triangular receptacle capable of coupling with a triangular shaped mounting bracket disposed on a bike share bicycle, and
    a sliding plunger mechanism capable of securing the mounting mechanism to the mounting bracket, such that the drive motor is capable of engaging with a tire or a wheel of the bike share bicycle.

11. The friction drive system of claim 10, further comprising a case at least partially enclosing the battery and the electronic control unit, wherein the case comprises a recess for storing the motor drive assembly.

12. The friction drive system of claim 10, wherein the motor drive assembly further comprises a pivot mechanism, the pivot mechanism is adjustable between a retracted position and an expanded position, and the motor drive assembly is at least partially enclosed by the recess when the pivot mechanism is in the retracted position.

13. The friction drive system of claim 10, wherein the motor drive assembly further comprises a roller, the drive motor is capable of delivering power to the roller, and the roller is capable of engaging with a tire or a wheel of the bike share bicycle.

14. The friction drive system of claim 13, wherein the motor drive assembly further comprises a pivot mechanism, and the roller is disposed on the pivot mechanism such that the roller is capable of engaging with the tire or the wheel of the bike share bicycle when the pivot mechanism is in an expanded position.

15. A friction drive system comprising:
a motor drive assembly comprising a drive motor;
a battery capable of providing power to the drive motor;
an electronic control unit capable of controlling delivery of power from the battery to the drive motor; and
a sliding plunger mechanism capable of securely attaching the friction drive system to a mount disposed on a wheeled vehicle.

16. The friction drive system of claim 15, wherein the motor drive assembly further comprises a roller, the drive motor is capable of delivering power to the roller, and the roller is capable of engaging with a tire or a wheel of the scooter or the bicycle.

17. The friction drive system of claim 15, wherein the friction drive system is capable of mounting to and providing power to both a scooter and a bicycle.

18. A friction drive system, comprising:
a power means for delivering mechanical power to a tire or a wheel of a wheeled vehicle;
a mounting means for mounting the friction drive system on the wheeled vehicle such that the friction drive system is capable of quick installation and removal from the wheeled vehicle, wherein the mounting means comprises a sliding plunger mechanism capable of securely attaching to the wheeled vehicle;
a supply means for supplying electrical power to the power means;
a control means for controlling the delivery of electrical power to the power means.

19. The friction drive system of claim 18, further comprising:
a pivoting means for pivoting the power means between a retracted position and an expanded position.

20. The friction drive system of claim 19, wherein the power means is at least partially enclosed by a case when in the retracted position.

21. The friction drive system of claim 18, wherein the wheeled vehicle is one of a scooter or a bicycle.

22. A method of powering a wheeled vehicle with a friction drive system, comprising the steps of:
mounting the friction drive system on the wheeled vehicle by securely coupling a mounting mechanism disposed on the friction drive system with a mount disposed on the wheeled vehicle using a sliding plunger mechanism, wherein the friction drive system comprises a pivot mechanism, a drive motor, a power supply, and an electronic control unit;
rotating the pivot mechanism to engage the drive motor with a wheel of the wheeled vehicle;
providing electrical power from the power supply to the drive motor;
providing mechanical power to the wheel with the engaged drive motor; and
regulating the electrical power supplied to the drive motor with the electronic control unit.

* * * * *